United States Patent [19]

Redman

[11] 4,118,676

[45] Oct. 3, 1978

[54] METHOD AND APPARATUS FOR DRIVING AN OPTICAL WAVEGUIDE WITH CONHERENT RADIATION

[75] Inventor: Charles M. Redman, Las Cruces, N. Mex.

[73] Assignee: The United States of America as represented by the Secretary of the Army, Washington, D.C.

[21] Appl. No.: 734,924

[22] Filed: Oct. 22, 1976

[51] Int. Cl.² ............................................. G02B 1/14
[52] U.S. Cl. .............................. 332/7.51; 350/96.30; 350/359; 350/96.15
[58] Field of Search .................... 332/7.51; 350/96 C, 350/161, 96 WG; 250/199; 333/30 R

[56] References Cited

U.S. PATENT DOCUMENTS

| | | | |
|---|---|---|---|
| 3,408,131 | 10/1968 | Kapany | 350/96 C |
| 3,571,737 | 3/1971 | Miller | 250/199 |
| 3,808,549 | 4/1974 | Maurer | 350/96 C |
| 3,871,743 | 3/1975 | Fulenwider | 350/96 WG |
| 3,919,669 | 11/1975 | Hartemann | 330/30 R |
| 3,920,982 | 11/1975 | Harris | 250/199 |
| 3,990,780 | 11/1976 | Dakss | 350/96 C |

FOREIGN PATENT DOCUMENTS 2,408,890   8/1974   Fed. Rep. of Germany ........ 350/96 C

OTHER PUBLICATIONS

Kapany, "Laser and Fiber Optics," pp. 1-7, Laser Focus, Jul. 1967.
Cunningham et al., "Integrated Optics Update," Aug. 1976, pp. 62-64, Electro-Optical Systems Design.

*Primary Examiner*—Nelson Moskowitz
*Attorney, Agent, or Firm*—Nathan Edelberg; Robert P. Gibson; Saul Elbaum

[57] ABSTRACT

A method and apparatus for driving an optical waveguide with a coherent source of radiation. The apparatus includes means for providing a relatively high level of continuous wave (cw) coherent optical/infrared radiation in a closed waveguide, preferably traveling in one direction, means for scattering the optical radiation out of the closed waveguide, and means for collecting the scattered radiation in an adjacent waveguide for transmission to distant points. The cw coherent radiation is preferably generated within a single-frequency traveling-wave multi-turn Nd: YAG laser. A first waveguide is coupled at the ends to form a multi-turn laser or a closed loop system. The scattering means includes means for impressing a microwave modulating signal onto the first waveguide at the Bragg angle which serves to set up an effective optical grating within the first waveguide for scattering the laser beam. The second or output waveguide is positioned with respect to the scattered beam for intercepting same to travel along its optical axis. In a preferred embodiment, the second waveguide is potted in a parallel relationship with the first waveguide and includes an inclined end surface for redirecting the scattered radiation along its optical axis.

13 Claims, 3 Drawing Figures

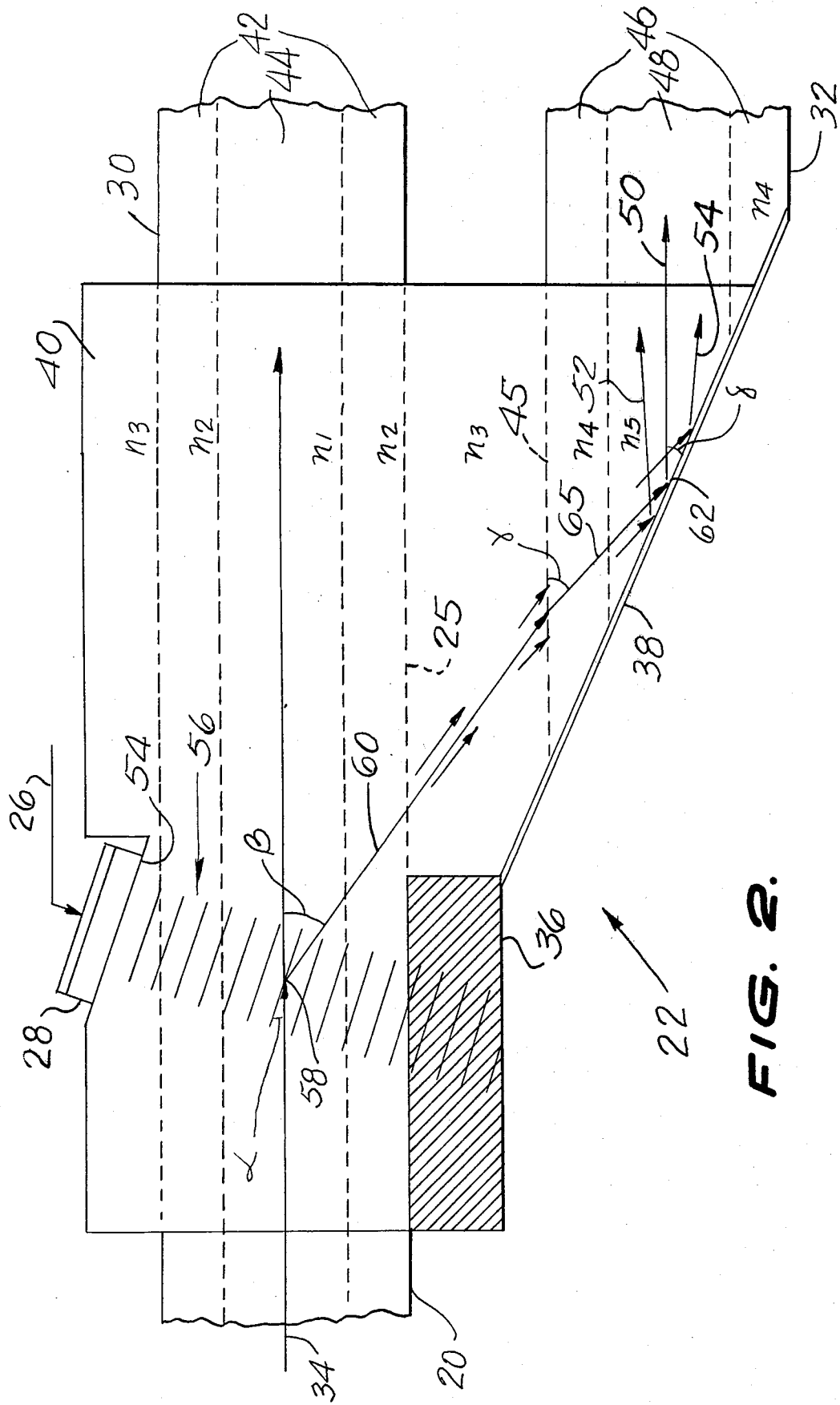

METHOD AND APPARATUS FOR DRIVING AN OPTICAL WAVEGUIDE WITH CONHERENT RADIATION

BACKGROUND OF THE INVENTION

1. Field of the Invention

The present invention is related to microwave data transmission on optical/infrared carrier signals by means of optical waveguides and, more particularly, is directed toward a means for effectively transferring and modulating a coherent source of optical/infrared radiation from its source path to a transmission line output device.

2. Description of the Prior Art

Optical waveguides of both the glass and single crystal types have been under intensive development for the purposes of data transmission. Optical waveguides are considerably more attractive for certain applications when compared with conventional transmission lines, such as coaxial cable and the like. For one thing, optical waveguides exhibit extremely low loss characteristics and are available in substantial lengths. For example, losses of less than 2 db/km in glass waveguides and lengths in excess of 2 km have been reported. Furthermore, optical waveguides are not subject to interference from electromagnetic radiation. Additionally, power handling capabilities in excess of 0.8 mw. per square cm. have been reported. Data bandwidth in excess of 10 GHz. can be transmitted over distances of up to 1 kilometer without serious distortion, and amplitude and heterodyne detection can process comparable data frequencies.

There do, however, exist serious problems in the areas of broadband modulation and insertion of coherent radiation into optical waveguides. State-of-the-art systems typically utilize laser diodes with optics to focus part of the optical signal into the end of a glass waveguide. Data modulation is achieved typically by modulating the voltage to the laser diode. This technique is, however, limited to relatively low power and is quite inefficient. Other prior art techniques utilize gas, crystal, or glass lasers, electro-optics or acousto-optic modulators and associated complex techniques for getting or transmitting the modulated carrier into the optical fiber waveguides. All of such techniques have exhibited problems in the areas of efficiency, power level achievable, and data bandwidth, to name a few.

Accordingly, while the development of glass and single crystal waveguides of the type which transfer gigahertz bandwidth data over optical or infrared carriers has been rapid, and while detection of such data at the far end of such optical waveguides is presently accomplished rather efficiently, there exist serious problems in the front end as concerns broadband modulation and insertion of coherent radiation into the waveguides, and clearly a more efficient technique and arrangement are needed.

One particular application of such optical information transmission systems which has both made me aware of prior art problems and has given rise to the present inventive technique concerns an indoor radar testing facility which utilizes an array of RF modules positioned on a nylon cable grid. Fiber optic waveguides are utilized to carry the radar signals to the array, with coherent optical radiation being utilized as the carrier signal. As pointed out above, presently available techniques do not lend themselves to efficient coupling of the modulated carrier into the waveguide.

OBJECTS AND SUMMARY OF THE INVENTION

It is therefore a primary object of the present invention to provide a method and apparatus for driving an optical waveguide with a source of coherent radiation which overcomes all of the disadvantages noted above with respect to prior art techniques and devices.

Another object of the present invention is to provide a technique for transferring coherent optical signals from relatively large lasers into optical waveguides which minimizes losses prevalent in prior art techniques and systems.

A further object of the present invention is to provide a method and apparatus for transferring and modulating an optical radiation source to a waveguide driver which increases efficiency by providing greater heat dissipation from the lasing media.

A still further object of the present invention is to provide a method and apparatus for transferring and modulating a source of coherent optical radiation to an optical waveguide for delivery to distant points which is highly efficient, is capable of handling a substantial power level and data bandwidth, and which accomplishes same in single mode small angular dispersion laser beam propagation.

A broadly stated object of the present invention is to provide a much simplified and less complex technique for efficiently generating the coherent optical carrier, for modulating the optical carrier with broadband data, and for inserting the carrier into optical waveguides.

The foregoing and other objects are attained in accordance with one aspect of the present invention through the provision of means for generating a carrier signal of continuous wave coherent radiation within a first optical fiber waveguide, output transmission line means comprising a second optical fiber waveguide, and means for transferring the carrier signal from the first waveguide to the second waveguide. The transferring means preferably includes means for modulating the optical carrier signal with a microwave signal, such as radar. In a preferred embodiment, the modulating means comprises an acousto-optic transducer means coupled to the first optical fiber waveguide for scattering the carrier signal in accordance with the microwave modulating signal. The acousto-optic transducer means preferably comprises a piezo-electric device mounted adjacent the first optical waveguide at the Bragg angle with respect to the optical carrier signal. The transducer effectively sets up an optical grating across the path of the carrier signal to deflect same. Means are positioned adjacent the first waveguide on the opposite side of the piezo-electric transducer for absorbing the transduced signal to minimize backscatter interference.

In accordance with other aspects of the present invention, the second optical waveguide may be oriented substantially parallel to the first waveguide and will then include means for redirecting the scattered modulated carrier signal through itself along its optical axis. In one embodiment, the redirecting means comprises an inclined surface formed on an end of the second optical waveguide, which may include means coated thereon for reflecting the scattered modulated carrier signal. Alternatively, the second optical waveguide may be oriented so as to be end-driven by the scattered radiation directly.

In accordance with still other aspects of the present invention, the carrier signal generating means comprises a multi-turn optical fiber waveguide laser, the respective ends of which are connected to the first optical fiber waveguide mentioned hereinabove. In a preferred embodiment, the multi-turn optical fiber waveguide laser is comprised of a Nd: YAG crystal fiber. Means, such as a Farraday rotator, may be disposed within the first optical fiber waveguide for permitting the generation of the optical carrier in one direction only.

In accordance with yet other aspects of the present invention, a method is provided for modulating a coherent optical signal with a microwave signal and for effectively transmitting the modulated signal to distant points, which comprises the steps of generating a coherent optical signal in a first optical waveguide, scattering the optical signal out of the first waveguide by the microwave signal, and receiving the scattered signal in a second optical waveguide for transmission to desired locations. The scattering step preferably includes the step of modulating the optical carrier signal by the microwave signal by transducing the latter and directing the output of the transducer across the path of the coherent optical signal at the Bragg angle.

BRIEF DESCRIPTION OF THE DRAWINGS

Various objects, features and attendant advantages of the present invention will be more fully appreciated as the same become better understood from the following detailed description thereof when considered in connection with the accompanying drawings, in which:

FIG. 2 is a schematic representation of a sectional view of the signal transfer device components of the apparatus illustrated in FIG. 1, helpful in understanding the mode of operation thereof.

DETAILED DESCRIPTION OF THE PREFERRED EMBODIMENT

Figure 1:
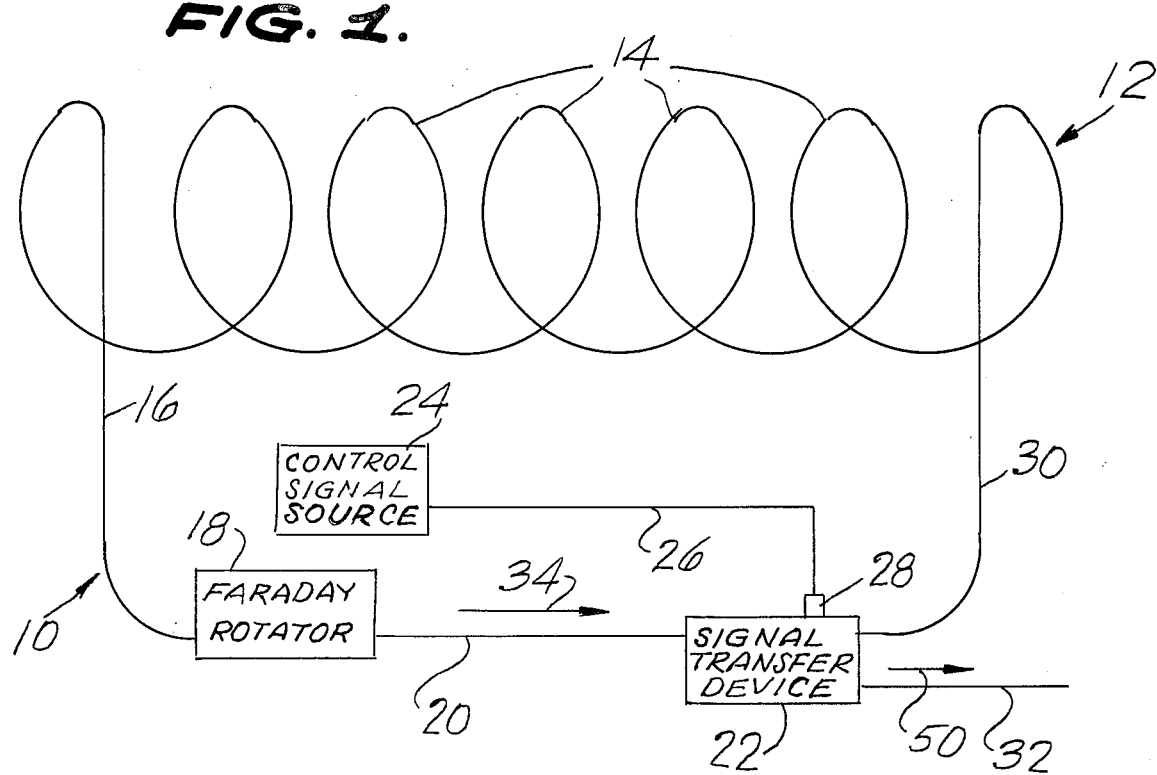
FIG. 1 is a schematic representation of the primary components of a preferred embodiment of the laser source waveguide driver in accordance with the present invention.

Referring now to the drawings, wherein like reference numerals indicate identical or corresponding parts throughout the several views, and more particularly to FIG. 1 thereof, there is illustrated a schematic representation of the component interconnection of a preferred embodiment of the laser source waveguide driver in accordance with the present invention which is indicated generally by the reference numeral 10.

The laser source waveguide driver system illustrated in FIG. 1 achieves efficient generation of coherent radiation within the confines of a waveguide and achieves efficient coupling of the radiation from one waveguide to another according to the characteristics of a microwave (GHz) signal that is desired to be transmitted on the output waveguide to distant points.

The means for generating the coherent carrier signal is indicated generally in FIG. 1 by the reference numeral 12 and preferably comprises a waveguide having a plurality of turns 14 and a pair of ends 16 and 30 which are suitably joined as at 20 to minimize reflections, scattering, and other losses. The waveguide 12 is formed from a material which can be pumped so as to invert energy levels and make feasible light amplification through stimulated emission. A number of suitable materials will suggest themselves to a person of ordinary skill in the art, such as Nd: YAG (Yttrium, Aluminum, Garnet with Neodymium doping). Nd: YAG is one of the better materials which will operate continuous wave (cw) and which can be grown into very long single crystal fibers.

Facilities for growing such fibers generally include a special furnace which has a combination electrical heater and laser spot heater. By way of example, a very pure sample of YAG with suitable Nd doping is placed in the furnace. Electrical heating brings the sample close to its melt point. A laser beam is suitably focused to a fine point on the sample to raise same above its melt temperature. A very small seed crystal of suitable orientation is lowered to the melt zone and then gradually withdrawn. By selection of a suitable combination of seed crystal, laser power, laser spot size, and pull rate, single crystal fibers of 10 to 50 microns in diameter may be grown to extended lengths.

Preferably, the Nd doping is depleted slightly in the outer part of the fiber to decrease its index of refraction to allow for single mode transmission, which occurs when $$\frac{2\pi a}{\lambda} (n_1^2 - n_2^2)^{\frac{1}{2}} < 2.4$$

wherein the radius of the fiber is a, $\lambda$ is the free space wavelength of lasing frequency, $n_1$ is the index of refraction of the core of the fiber, and $n_2$ is the index of refraction of the depleted Nd cladding. The fiber is wound, as indicated in FIG. 1, in a coiled form of one or a plurality of turns 14 on a hollow transparent or otherwise removable core. The windings 14 are suitably displaced to minimize optical coupling between successive turns. An optical reflecting film is then deposited on the outside of the coil, and, after removal of the core, an outside layer is applied to give the multi-turn optical waveguide suitable strength and to act as a heat dissipator. A suitable optical pump is then installed within the coil so that the lasing fiber is radiated from within.

Radiation within the lasing fiber 14 is typically in both the clockwise and counterclockwise directions. However, only one direction is normally utilized, such as indicated by reference numeral 34 in FIG. 1. A conventionally known device for inserting a differential phase delay in the waveguide, such as the Faraday rotator 18, may be utilized to phase out the clockwise rotation, for example, to thereby increase the magnitude and purity of the counterclockwise radiation.

Other materials which may be suitable as a single mode optical waveguide 12 include, for example, Neodymium doped lanthanum beryllate, also known as Nd: BEL. Other suitable materials will suggest themselves to a person of ordinary skill in the art.

It should be understood that the construction of the laser 12 from very small diameter and very long multi-turn optical waveguides permits efficient heat transfer out of the laser and high level lasing with low gain per unit length. This permits utilization of Nd doped glass waveguides for the laser which simplifies construction and minimizes problems associated with, for example, birefringent materials.

The first optical waveguide 20 connecting the ends 16 and 30 of the multi-turn laser 12 is coupled into the input end of a signal transfer device 22 which serves to impress a control signal 26 from source 24 thereon. This is achieved via a transducer or like device 28 mounted adjacent the first waveguide 20, and results in an output optical signal along the output waveguide 32. In the preferred mode, control signal source 24 provides a communications control signal along line 26 which is a microwave or radar signal on the order of 5.5 ± 0.25 GHz. While other modulation signals may obviously be utilized, the preferred mode of the present invention to be described hereinafter will be done so in connection with this preferred embodiment in order to simplify the explanation of its operation.

Figure 3:
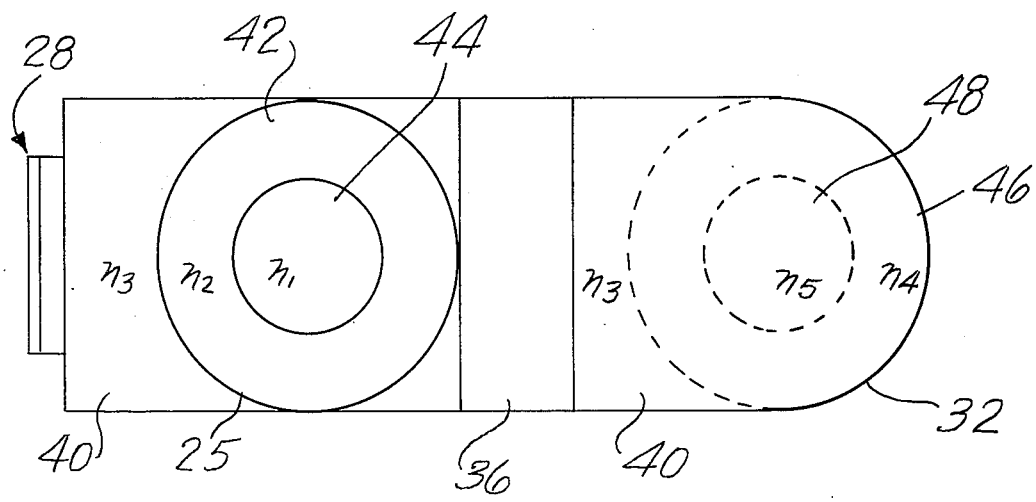
FIG. 3 is an end view of the apparatus illustrated in FIG. 2.

Referring now to FIGS. 2 and 3, the signal transfer device 22 of FIG. 1 is illustrated in more detail in sectional and end views, respectively. In FIG. 2, the Nd: YAG laser fiber is indicated by the reference numerals 20, 25 and 30 which respectively indicate the input portion, transfer device portion, and output portions thereof. The transfer device portion 25 of the laser fiber is shown potted in parallel with the end 45 of the glass waveguide transmission line 32. The two waveguides 25 and 45 are fixed quite close together, but sufficiently far apart to minimize possible cross-coupling.

Reference numeral 44 indicates the Neodymium doped YAG core having an index of refraction $n_1$ which is approximately 1.83. Its depleted Neodymium cladding is indicated by reference numeral 42 and has an index of refraction $n_2$ substantially the same as the center core 44. The potting material 40 which surrounds the cladding 42 has an index of refraction $n_3$ quite close to that of the cladding 42 so as to minimize any adverse optical interfacing effects on optical signals passing from the fiber core 44 through the cladding 42 and into the potting material 40. The potting material 40 preferably has an acoustic velocity of propagation close to that of YAG so as to minimize any adverse effects on gigahertz frequencies propagating through the YAG-potting material combination.

The glass waveguide 32, into which a modulated optical signal is to be coupled, preferably has an index of refraction $n_4$ close to that of the laser waveguide 25. The index of the core $n_5$ must be properly related to the index of its cladding 46 ($n_4$) so as to provide for single mode propagation, in much the same fashion as the lasing fiber 25.

The end 45 of the glass waveguide 32 is cut at an angle onto which a light reflecting layer 38 may be added as illustrated in FIG. 2. In the specific example, the radiation will be reflected with or without a reflecting layer since transmission through the glass-air interface follows the equation $\eta \cos \delta = \eta' \cos \delta'$, where $\eta$ is index of refraction of glass (1.6) and $\eta'$ is that of air (1.0), $\delta$ is angle of radiation as shown in FIG. 2 and $\delta'$ is exit angle from glass with no reflecting layer. If $\eta \cos \delta$ is less than unity the radiation reflects at the glass air interface. If $\eta \cos \delta$ is greater than unity the radiation passes into the air.

The acoustic transducer 28 is mounted on an inclined face 54 formed within the potting compound 40 so as to beam the input microwave signal across the waveguide 25 at the Bragg angle. An absorbing material 36 is placed so as to absorb the acoustic signal 56 transmitted by transducer 28 to minimize back scattering into the waveguide 25. The angle alpha ($\alpha$) represents the Bragg angle that the acoustic wave 56 makes with the optical carrier signal 34, while the angle beta ($\beta$) represents the angle of the deflected radiation 60 after intersection at 58 with the laser carrier 34. The angle ($\gamma$) represents the incident angle to the optical waveguide 32, which differs from $\beta$ as a result of the $n_3$ to $n_4$ interface, while angle $\delta$ represents the angle of the cut surface 38 with respect to the optical axis 50 of output transmission line waveguide 32.

By way of example, if a Nd: YAG waveguide 25 is utilized, the acoustic velocity of propagation therein is $8.6 \times 10^3$ M/S in the longitudinal direction, and $5.03 \times 10^3$ M/S in shear. Utilizing the latter velocity as an example, and a 5.5 GHz drive signal, the acoustic wavelength will be 0.915 microns. The wavelength of the lasing signal in this media will therefore be 0.579 microns, making the Bragg angle for optimum deflection $\alpha$ equal to 18.45°. An increase of 0.25 GHz causes an increased deflection of 1.76°, while a decrease of 0.25 GHz will cause a decreased deflection of 1.71°. The radiation in the YAG waveguide is not in parallel rays, however by keeping $n_1$ close to $n_2$, dispersion may be minimized. The efficiency of the Bragg deflection is a function of interactive volume, and with a waveguide core diameter of 10 microns, and comparable acoustic signal beam width, the volume will be small. This, in turn, requires utilization of a very small, but greater intensity, acoustic signal in order to scatter the guided coherent radiation out of the line. In some cases, a loading line over the acoustic path will assist in guiding the acoustic signal propagation.

The deflected radiation 60 will be at an angle $\beta$ of approximately 36.9° plus 1.76° or minus 1.71° over the 5.5 GHz ± 0.25 GHz spectrum. The $n_3$ to $n_4$ interface will cause a change in the angle to $\gamma$ which will become 43.4° ± 1.8° as it enters the glass waveguide 45. The entered beam 65 will be deflected as at 62 off of the reflecting film 38 so as to propagate as beam 50 down the axis of waveguide 32.

The acousto-optic transducer 28 in effect sets up an optical grating 56 for the input optical radiation 34. Typically, transducer 28 comprises a piezo-electric device such that its applied electric signal at 26 causes stresses which in turn change the effective index of refraction within fiber 25 to cause the optical carrier 34 to be deflected. The Bragg deflection scatters the radiation 34 as at 60 out of the laser 25 according to the magnitude of the acoustic waves and in a direction according to the wavelength of the acoustic waves.

The scattered radiation will be predominantly deflected along the axis of the glass waveguide 32. While the axis of waveguide 32 is indicated in FIGS. 2 and 3 as being substantially parallel to that of the laser 25, it will be understood that the glass waveguide 32 may just as easily be potted at an angle of, in the example, 43.4° to the axis 34 of the lasing waveguide 25 so that the deflected radiation 60 will end drive the glass waveguide 32 directly. Utilization of the latter configuration will allow optical lens effects to be added to the end of glass waveguide 32 to maximize the amount of entering energy.

The present invention may be constructed in any of several ways. One technique utilizes a dissolvable core. A fine spiral groove is cut into the circumference of the core about half the diameter of the laser waveguide. The waveguide is then wound on the core following the precut groove. A good optically reflecting film, such as aluminum, is then deposited over the waveguide and core. This film is increased in depth until it is at least several waveguide diameters thick. The film is then polished so as to remove any ridges from over the waveguide. A good heat-conducting cement is then placed over the aluminum. Thereafter, a good metal heat radiator with a snug fit is slipped over the waveguide coil. The assembly is then placed in a dissolver and the core is removed. The laser pumping lamp is then firmly mounted inside the waveguide coil so as to radiate the exposed waveguide. The two ends of the waveguide are then suitably joined so as to minimize reflections or scattering of guided coherent radiation.

The external waveguide portion is mounted in a jig or the like to hold a section firmly in place in a suitable mold. The output glass transmission waveguide end is then suitably mounted so as to collect scattered radiation from the laser waveguide. This may be a parallel mounting as illustrated in FIGS. 2 and 3, or an angular mounting so as to align the output transmission waveguide axis with the center line of the scattered radiation. The potting material is then applied in the mold to secure the two waveguides. An absorber 36 may either be molded during potting or cemented in place after potting. Machine work may be required to finish the reflecting surface 38 and the acoustic transducer 28 mounting surface. The reflecting film 38 is then deposited and the transducer 28 added.

Obviously, numerous modifications and variations of the present invention are possible in light of the above teachings. It is therefore to be understood that within the scope of the appended claims the invention may be practiced otherwise than as specifically described herein.

I claim as my invention:

1. Apparatus, which comprises:
    means for generating a carrier signal of continuous wave coherent radiation within a first optical fiber waveguide, wherein said carrier signal generating means comprises a multi-turn fiber waveguide laser the respective ends of which are connected to said first optical fiber waveguide;
    output transmission line means comprising a second optical fiber waveguide; and
    means for scattering said carrier signal from said first waveguide to said second waveguide, wherein the second waveguide is aligned with respect to the scattered carrier signal so that the signal will be intercepted and travel along the optical axis of the waveguide.

2. The apparatus as set forth in claim 1, wherein said scattering means includes means for modulating said optical carrier signal with an acoustic signal.

3. The apparatus as set forth in claim 2, wherein said modulating means comprises an acousto-optic transducer means coupled to said first optical fiber waveguide for scattering said carrier signal in accordance with a microwave modulating signal.

4. The apparatus as set forth in claim 3, wherein said acousto-optic transducer means comprises a piezoelectric device mounted adjacent said first optical waveguide at the Bragg angle with respect to said carrier signal.

5. The apparatus as set forth in claim 4, further comprising means positioned adjacent said first optical fiber waveguide opposite said transducer means for absorbing the output signal from said transducer means whereby backscatter interference is minimized.

6. The apparatus as set forth in claim 3, wherein said second optical waveguide is oriented substantially parallel to said first waveguide and includes means for redirecting said scattered modulated carrier signal through said second optical waveguide.

7. The apparatus as set forth in claim 6, wherein said redirecting means comprises an inclined surface means formed on an end of said second optical waveguide for reflecting said scattered modulated carrier signal.

8. The apparatus as set forth in claim 1, wherein said multi-turn optical fiber waveguide laser is comprised of a Nd: YAG crystal fiber.

9. The apparatus as set forth in claim 1, further comprising means disposed within said first optical fiber waveguide for permitting the generation of a carrier signal in one direction only.

10. The apparatus as set forth in claim 9, wherein said permitting means comprises a Faraday rotator.

11. A method for modulating a coherent optical signal with an acoustic signal and for effectively transmitting the modulated signal to distant points, comprising the steps of:
    connecting the respective ends of a first optical waveguide to a multi-turn fiber waveguide laser which can generate an optical carrier signal;
    generating a coherent optical signal in the first optical waveguide;
    scattering said optical signal out of said first waveguide by said acoustic signal;
    aligning a second optical waveguide with respect to the scattered carrier signal so that it will drive the second optical waveguide along its optical axis; and
    receiving said scattered signal in the second optical waveguide for transmission to desired locations.

12. The method as set forth in claim 11, wherein said scattering step includes the step of modulating said optical carrier signal by said acoustic signal.

13. The method as set forth in claim 12, wherein said scattering and modulating steps include the steps of transducing a microwave signal and directing said transduced signal across the path of said optical signal at the Bragg angle.

* * * * *